(12) United States Patent
Liu

(10) Patent No.: US 6,771,790 B2
(45) Date of Patent: Aug. 3, 2004

(54) EAR SET FOR A CELLULAR PHONE

(76) Inventor: Hung-Chang Liu, No. 162, Sec. 1, Chung-Hsin Rd., Wu-Ku Hsiang, Taipei Hsien (TW)

( * ) Notice: Subject to any disclaimer, the term of this patent is extended or adjusted under 35 U.S.C. 154(b) by 60 days.

(21) Appl. No.: 10/336,675

(22) Filed: Jan. 6, 2003

(65) Prior Publication Data

US 2004/0131220 A1 Jul. 8, 2004

(51) Int. Cl.[7] ............................................... H04R 25/00
(52) U.S. Cl. ......................... 381/385; 381/375; 381/381
(58) Field of Search ................................. 381/370, 374, 381/375, 381, 330, 385, 364; 181/128, 129, 130, 135; 379/430

(56) References Cited

U.S. PATENT DOCUMENTS

| | | | | |
|---|---|---|---|---|
| 3,604,069 A | * | 9/1971 | Jensen | 24/332 |
| 4,273,969 A | * | 6/1981 | Foley et al. | 379/430 |
| 4,893,344 A | * | 1/1990 | Tragardh et al. | 381/381 |
| 6,038,329 A | * | 3/2000 | Lee | 381/370 |
| 6,449,374 B1 | * | 9/2002 | Skulley et al. | 381/381 |
| 2001/0017926 A1 | * | 8/2001 | Vicamini | 381/380 |
| 2004/0008855 A1 | * | 1/2004 | Ham | 381/381 |

* cited by examiner

Primary Examiner—Curtis Kuntz
Assistant Examiner—P. Dabney
(74) Attorney, Agent, or Firm—Rosenberg, Klein & Lee

(57) ABSTRACT

A ear set for a cellular phone has a hollow body, an ear hook, an electric wire, a plug and a clip. The body has an earphone, a microphone, a pocket clip, a cap and a switch. One end of the pocket clip is attached to one end of the body. A protruding ball is mounted on the other end of the pocket clip above a hole through the body. The hole is located over a switch mounted inside the body so the protruding ball will contact and activate the switch when the pocket clip is pressed. This makes turning on or turning off the ear set easier and more convenient than pressing a discrete switch.

5 Claims, 5 Drawing Sheets

EAR SET FOR A CELLULAR PHONE

BACKGROUND OF THE INVENTION

1. Field of the Invention

The present invention relates to an ear set with a microphone and an earphone, and more particularly to an ear set for a cellular phone.

2. Description of Related Art

With time goes by, cellular phones become more popular. According to the medical reports, cellular phones produce electromagnetic waves that hurt people who use them, especially their heads. As the distance of the cellular phone from a person's head increases, the likelihood of an injury from the electromagnetic waves will decrease. Using ear sets to increase the distance between the cellular phone and the user's head is suggested, and them will protect the head from the electromagnetic waves.

With reference to FIG. 5, a conventional ear set (20) has an earphone (21), a plug (24), a microphone (22), a switch (23) on the side of the microphone (22) and an electric wire (not numbered) electrically connecting the earphone (21), the microphone (22), the switch (23) and the plug (24) in series.

When using the conventional ear set (20), the plug (24) connects to a cellular phone, and the earphone (21) is placed in a user's ears. The switch (23) is pressed to answer or terminate a phone call.

When answering a phone call, users press the switch (23) to turn on the switch (23). Because the contact area of the switch (23) on conventional ear sets (20) is small and the position of the switch (23) is hard to see, delays in answering a call often result, and some calls may be missed. The conventional ear sets (20) still needs a convenient contact area for the switch (23).

To overcome the shortcomings, the present invention provide a pocket clip that doubles as a contact area for the switch on an ear set to mitigate or obviate the aforementioned problem.

SUMMARY OF THE INVENTION

The primary objective of the present invention is to provide an ear set with a switch and an increased contact area to activate the switch. The ear set in accordance with the present invention comprises a body, an ear hook, a clip, an electric wire and a plug.

The body is hollow and has an earphone, a microphone, a pocket clip, a cap and a switch.

A pocket clip with a protruding ball is mounted on a proximal end of the body, and a switch is mounted in the body under a hole in the body. The protruding ball on the pocket clip is aligned with the hole in the body and contacts the switch when the pocket clip is pressed.

Other objects, advantages and novel features of the invention will become more apparent from the following detailed description when taken in conjunction with the accompanying drawings.

DETAILED DESCRIPTION OF THE PREFERRED EMBODIMENT

Figure 1:
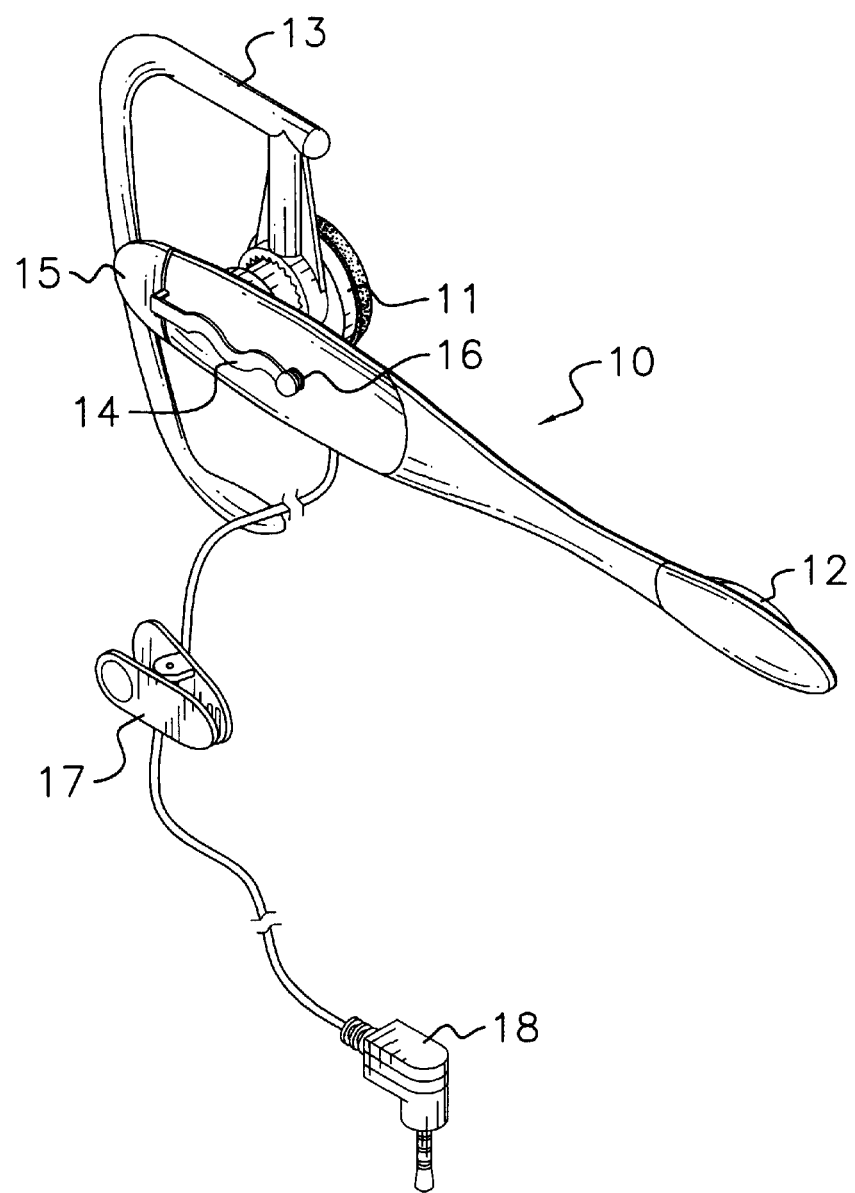
FIG. 1 is a perspective view of the ear set with a pocket clip in accordance with the present invention.

With reference to FIG. 1, an ear set in accordance with the present invention includes a body (10), an ear hook (13), a clip (17), an electric wire (not numbered) and a plug (18).

Figure 2:
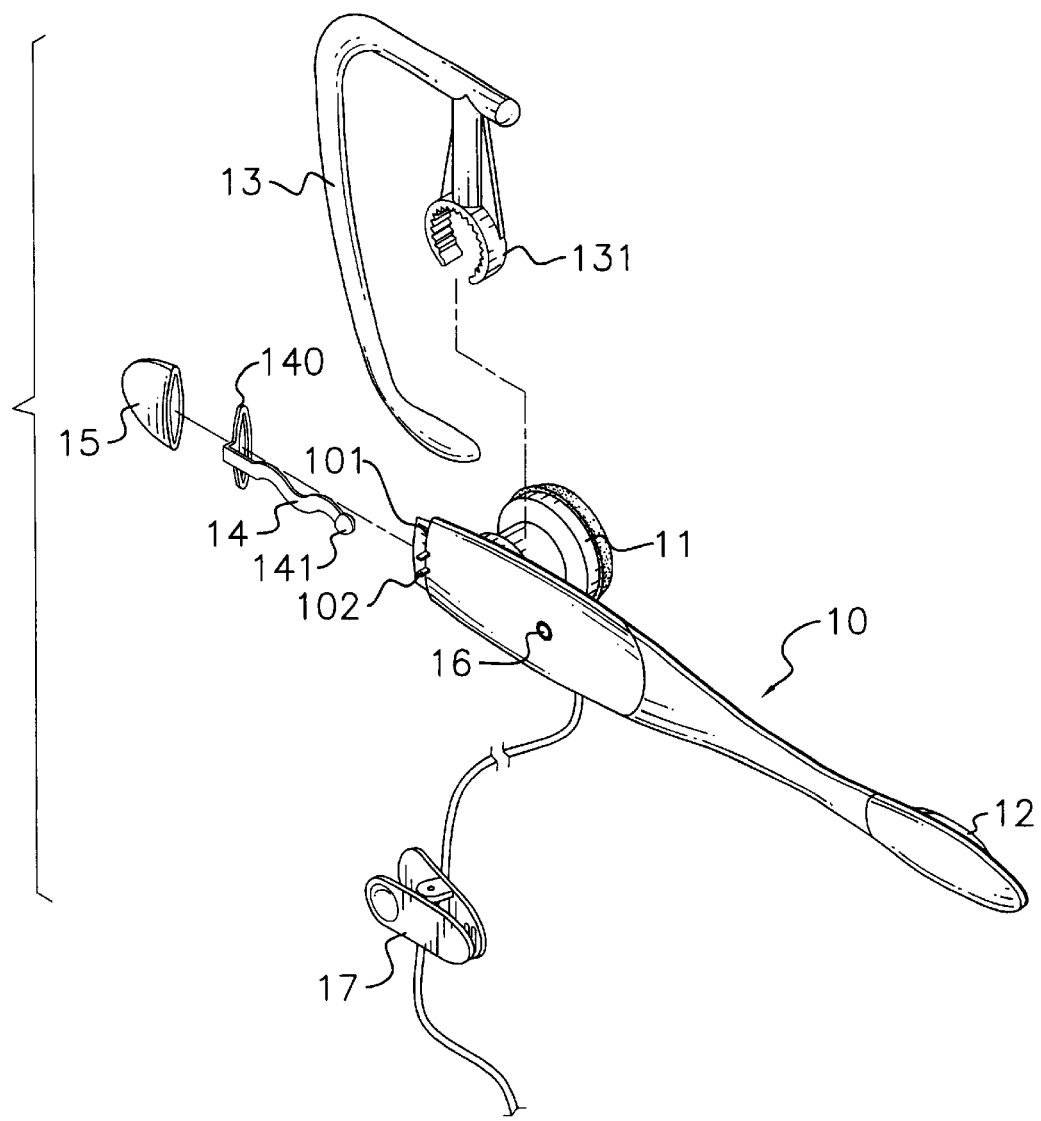
FIG. 2 is an exploded perspective view of the ear set in FIG. 1.

With further reference to FIG. 2, the body (10) is hollow and has a distal end (not numbered), a proximal end (not numbered), an outside surface (not numbered), an inside surface (not numbered), an earphone (11), a microphone (12), a pocket clip (14), a cap (15) and a switch (16). A seat (101) is formed on the proximal end of the body (10), and two support studs (102) are formed on and extend perpendicular from the outside surface of the body (10) near the seat (101). The earphone (11) protrudes from and is mounted on the inside surface of the body (10) near the proximal end. The microphone (12) is mounted inside the body (10) at the distal end with acoustic access to the microphone (12) through the inside surface.

The pocket clip (14) has a proximal end (not numbered), a distal end (not numbered), a mounting ring (140) and a protruding ball (141). The mounting ring (140) is formed on the proximal end of the pocket clip (14) and is mounted around the seat (101) on the proximal end of the body (10). The pocket clip (14) extends between the support studs (102), and the cap (15) is mounted over the seat (101) to hold the pocket clip (14) securely in place. The protruding ball (141) is formed on the distal end of the pocket clip (14).

The switch (16) is mounted in the body (10) and faces a hole (not numbered) in the outside surface under the protruding ball (141). The switch (16) is electrically connected with the earphone (11) and the microphone (12), and faces the protruding ball (141) of the pocket clip (14).

The electric wire has a distal end (not numbered) and a proximal end (not numbered). The proximal end is connected to the switch (16) inside the body (10). The plug (18) is attached to the distal end of the electric wire. The clip (17) is attached to the electric wire between the body (10) and the plug (18).

The ear hook (13) is C-shaped and has a top end (not numbered), a bottom end (not numbered) and a C-shaped clamp (131). The C-shaped clamp (131) is formed on the top end of the ear hook (13) and extends toward the bottom end. A serrated surface is defined inside the C-shaped clamp (131).

Figure 3:
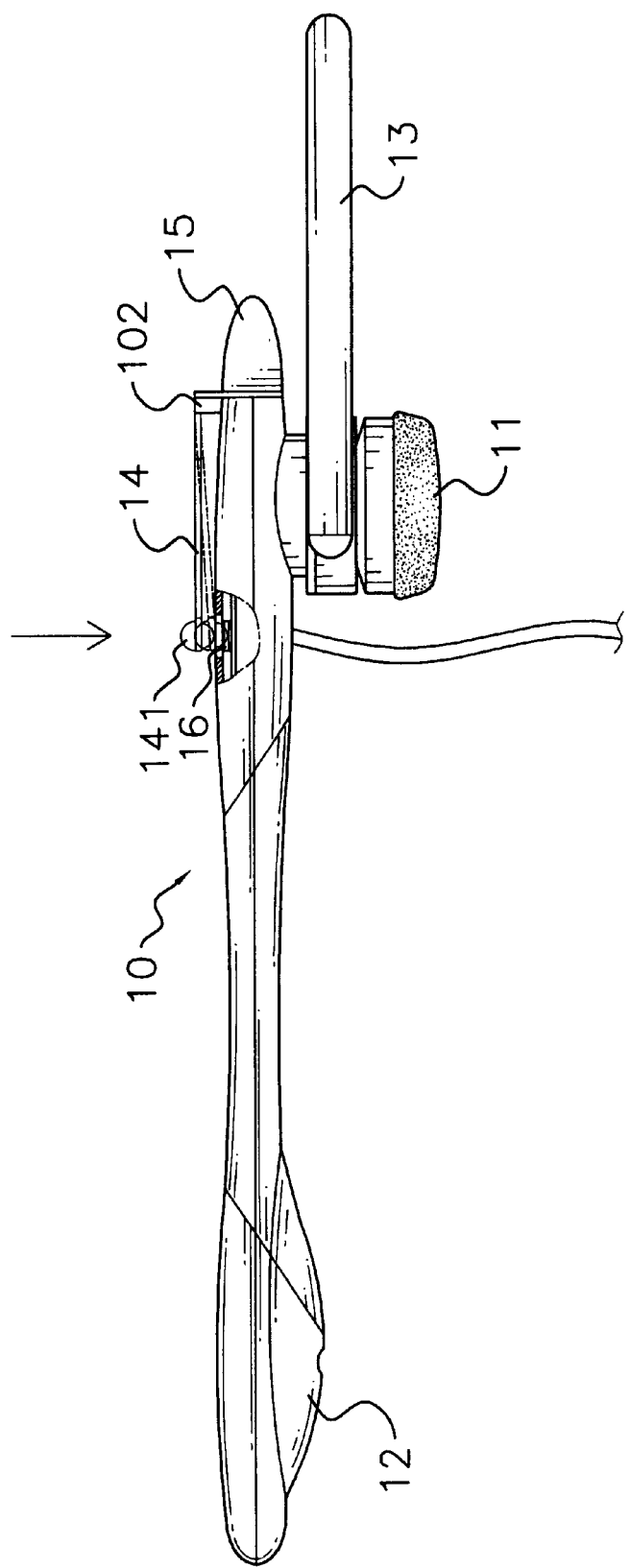
FIG. 3 is a top plan view of the ear set in FIG. 1.
Figure 4:
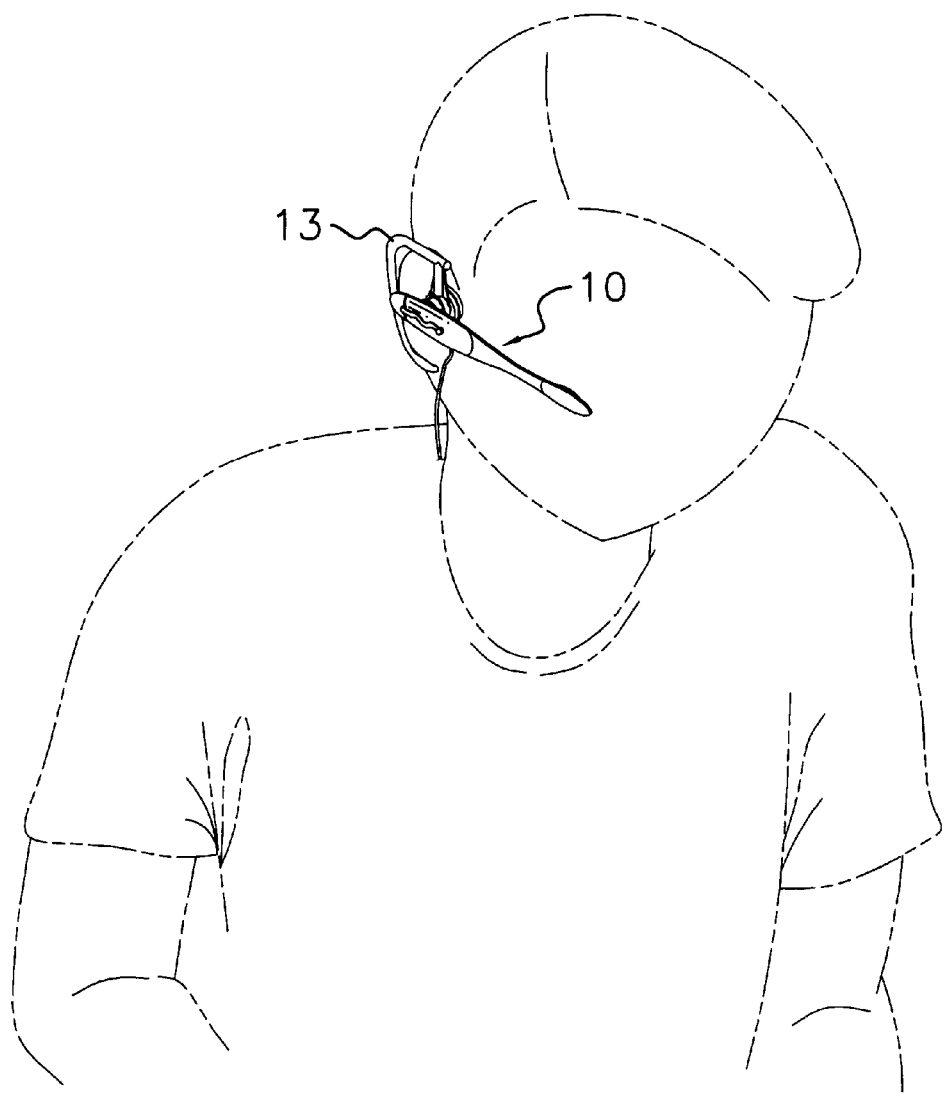
FIG. 4 is an operational perspective view of a person wearing the ear set in FIG. 1.
Figure 5:
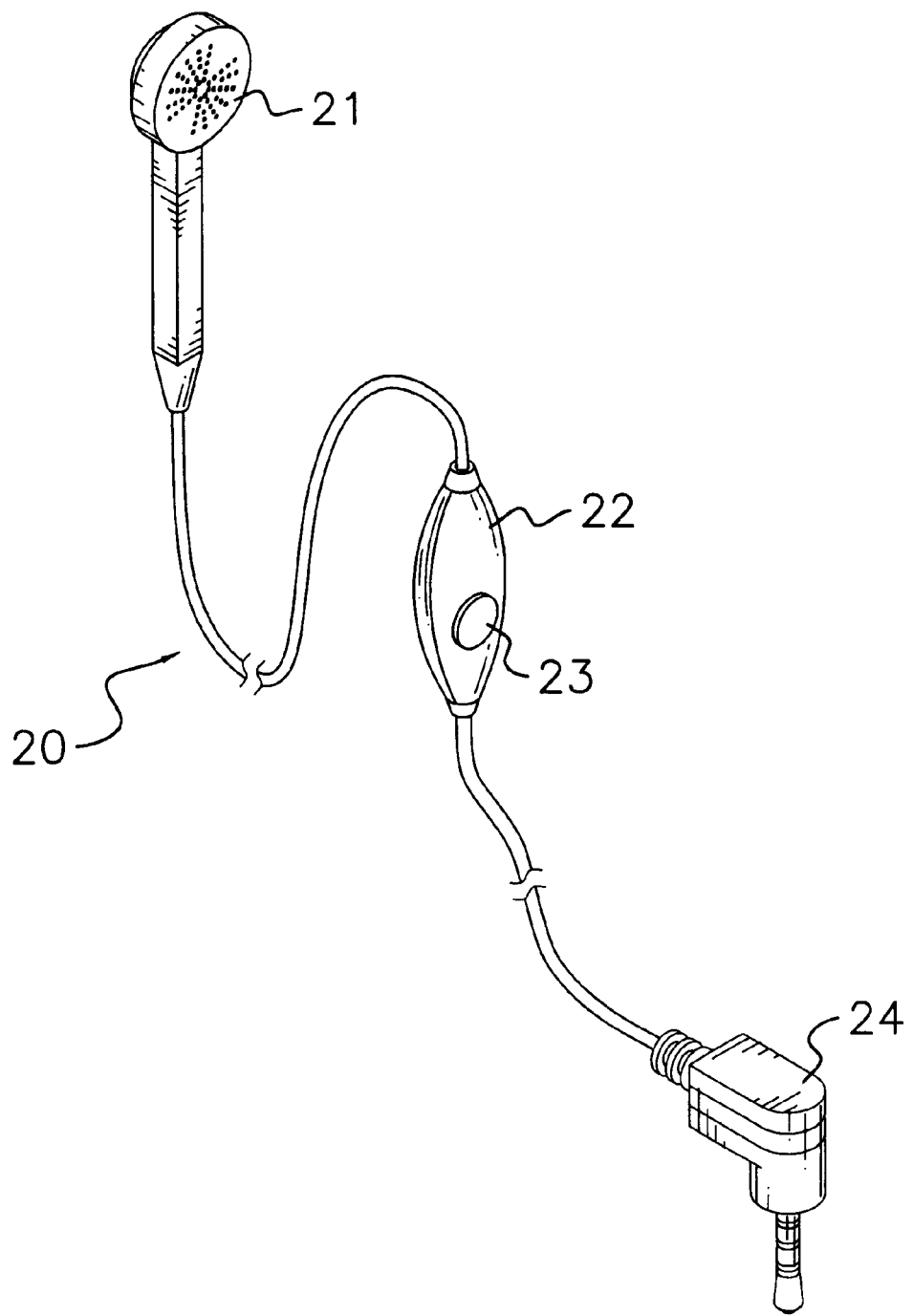
FIG. 5 is a perspective view of a conventional ear set in accordance with the prior art.

With the reference to FIGS. 2 and 3, the ear hook (13) is attached to the protruding earphone (11) on the body (10) by the C-shaped clamp (131). With the reference to FIGS. 1 and 4, the plug (18) is connected to a cellular phone when the ear set is used, and the electric wire of the ear set is attached to clothes with the clip (17).

With the reference to FIG. 3, because the protruding ball (141) of the pocket clip (14) is located above the hole and faces the switch (16), the switch (16) will be actuated when the pocket clip (14) is pressed downward. A phone call can be answered or terminated by simply pressing the pocket clip (14). It will be much easier and more convenient than pressing the protruding ball (141) to turn on or turn off the switch (16).

The pocket clip (14) also makes carrying the ear set convenient. The pocket clip (14) can easily be attached to a pocket (not shown) or a strap (not shown).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An ear set for a cellular phone where the ear set comprises a body, an ear hook, an electric wire, a plug and a clip;

the body being hollow and having
      a distal end;
      a proximal end with a seat formed on the proximal end;
      an outside surface with a hole defined through the outside surface;
      an inside surface;
      an earphone protruding from and mounted on the inside surface of the body near the proximal end;
      a microphone mounted inside the body at the distal end with acoustic access to the microphone through the inside surface; and
      a pocket clip having a proximal end, a distal end, a mounting ring formed on the proximal end and mounted around the seat and a protruding ball formed on the distal end of the pocket clip,
   a switch attached to the body, facing the protruding ball of the pocket clip and electrically connected with the earphone and the microphone; the electric wire having
      a distal end attached to the plug that is adapted to connect the ear set to a cellular phone and
      a proximal end connected to the switch inside the body, the ear hook having
      a top end;
      a bottom end; and
      a C-shaped clamp formed on the top end of the ear hook, extending toward the bottom end and attached to the protruding earphone;
   a clip attached to the electric wire between the body and the plug.

2. The ear set for a cellular phone as claimed in claim 1 further comprising two support studs formed on and extending perpendicular from the outside surface of the body near the seat, and the pocket clip extends between the support studs.

3. The ear set for a cellular phone as claimed in claim 1 wherein the switch is mounted in the body or mounted on the body.

4. The ear set for a cellular phone as claimed in claim 1 further comprising a cap mounted on the seat to hold the pocket clip in place.

5. The ear set for a cellular phone as claimed in claim 1 wherein a serrated surface is defined inside the C-shaped clamp of the ear hook.

* * * * *